United States Patent [19]

Maranda

[11] Patent Number: 5,432,753

[45] Date of Patent: Jul. 11, 1995

[54] TARGET DETECTOR AND LOCALIZER FOR PASSIVE SONAR

[75] Inventor: Brian H. Maranda, Victoria, Canada

[73] Assignee: Her Majesty the Queen as represented by the Minister of National Defence of Her Majesty's Canadian Government, Ottawa, Canada

[21] Appl. No.: 249,740

[22] Filed: May 26, 1994

[30] Foreign Application Priority Data

Sep. 2, 1993 [CA] Canada ............... 2105462

[51] Int. Cl.$^6$ ............................. G01S 15/00
[52] U.S. Cl. ................... 367/124; 367/125; 367/130; 367/135
[58] Field of Search ............ 367/135, 125, 124, 130; 364/517

[56] References Cited

PUBLICATIONS

Joseph C. Hassab; "Contact Localization and Motion Analysis in the Ocean Environment: A Perspective": pp. 136–147; Published in the IEEE Journal of Oceanic Engineering, vol. OE-8, No. 3, Jul. 1983.

Marc Solal et al: "Simultaneous detection and target motion aanalysis from conventional passive beamforming outputs": pp. 1321–1324; published in IEEE Int. Conf. on Acoustics, Speech and Signal Processing, 1991(ICASSP '91).

Brian H. Maranda et al: "Decetion and Localization of Weak Targets by Space–Time Integration": published in IEEE Journal of Oceanic Eng., vol. 16, No. 2.

John A. Fawcett et al.: "Localization by Mamimizing Long–Term Integrated Spectral Power": pp. 460 to 464; published in the IEEE Trans. on Signal Processing, vol. 40, No. 2, Feb. 1992.

Primary Examiner—Daniel T. Pihulic
Attorney, Agent, or Firm—Larson & Taylor

[57] ABSTRACT

A system for target detection and localization with an algorithm for performing target motion analysis (TMA) using data from a passive sonar array and which works directly with beam spectra to estimate the target track. The system determines when the coordinate trajectory of a hypothesized target aligns with the coordinate trajectory of an actual target and operates by forming long-term integrated spectral values from short-term values of frequency and angle coordinate values. The hypothesized target track that yields the maximum long-term integrated spectral value is used as the estimate of the true target track. A track generator is used to generate hypothesized target tracks for a search grid in the form of vectors that are clocked downward in a chain of latches. The latches are connected through computational elements, which are supplied with non-acoustic data, and RAMs to a summation pipeline, the RAMs being supplied with data from an array's sonar processor. The computational elements compute and provide angle and frequency addresses to the RAMs whose outputs are applied to adders in the summation pipeline. Each RAM holds data for a single two-dimensional FRAZ spectrum. The summation pipeline supplies a completed sum of short-term spectral values at its output to provide the required long-term integrated spectral values.

10 Claims, 3 Drawing Sheets

TARGET DETECTOR AND LOCALIZER FOR PASSIVE SONAR

FIELD OF THE INVENTION

The invention relates to a target motion analysis (TMA) system wherein the analysis is performed directly from the beam spectra produced by a passive towed array sonar system with an improved algorithm and in particular relates to a hardware architecture implementation of the algorithm.

BACKGROUND OF THE INVENTION

Localization by target motion analysis (TMA) is a standard technique used in passive sonar systems. There are many TMA algorithms available at present which use as their inputs a time sequence of bearing measurements and, if the target is narrowband, frequency measurements as well. A discrete sequence of parameter estimates must be obtained at the output of the sonar processor before performing the target motion analysis. This parameter estimation, in its simplest form, reduces to measuring the coordinates of a peak in a two-dimensional frequency-azimuth (FRAZ) power spectrum. It is desirable that the TMA process be automated with the data extraction being performed without operator intervention. In this manner, the bearing/frequency history of multiple targets can be obtained without dedicating an operator to the task of data extraction. However, the automatic following of a spectral peak as time progresses poses difficulties, particularly for passive sonars.

There are several reasons why target motion analysis with passive sonar is inherently difficult. The primary difficulty is the variation of the received acoustic signal resulting from the complex propagation structure of the oceanic medium through which it transits. The received signal may, for instance, have transited through a spectral region of elevated broadband noise produced by a noisy surface vessel. It is, as a result, quite common for signals to fade in and out and at least some fades may last for several integration periods of the sonar processor. The effect of these fades, for whatever cause, is a loss of signal-to-noise ratio (SNR) that can periodically place the signal below the detection threshold.

This sort of signal fading is an impediment to the successful implementation of any automatic signal-follower that attempts to follow a signal by associating a peak in each incoming spectrum with a peak in the previous spectrum. This requires that some method be found to "ride out" fades and associate a reappearing spectral peak with one that existed several integration periods previously. Furthermore, as the SNR of a received signal fluctuates, a noise peak in the immediate vicinity of the signal peak may exceed it in magnitude yielding spurious values for the estimated bearing and frequency. Therefore, it is necessary to pre-filter the raw parameter estimates before they are used as inputs to the TMA algorithm in order to eliminate outliers, i.e. values so far removed from others that their presence may adversely affect the TMA algorithm. However, this pre-filtering stage is usually not robust so the results cannot be confidently used for target motion analysis without examining them and, if necessary, manually correcting them.

A method of target motion analysis according to the present invention can deal with many of the above-mentioned difficulties. This method can be used for both bearings-only and Doppler/bearing TMA. The method, according to the present invention, integrates raw FRAZ spectra in both time and space along the coordinate trajectory generated by a hypothesized target track. That is, frequency and bearing values (the coordinates in frequency-azimuth space) that would be observed by the sonar system are computed for each point on a hypothesized target track corresponding to an integration period of the sonar processor. A long-term spectral value for the entire observation time is then obtained by non-coherently time integrating the spectral values along the coordinate trajectory generated by the hypothesized track. This is in contrast to known sonar signal processing in which the time integration is always for the same frequency bin and the same beam or azimuth.

The search for a target is conducted by integrating over a large number of hypothesized constant-velocity tracks. The search is organized by constructing a dense grid of start and end positions connected by straight-line tracks. The speed required for the target to traverse each hypothesized track is readily found since the total observation time is known. In the narrowband case, when Doppler effects are present, the rest frequency of the emitted tonal must be known in order to compute the frequency that would be observed by the sonar as a function of time. However, the rest frequency is generally unknown and this makes it necessary for the search to proceed over a discrete set of hypothesized rest frequencies as well. The hypothesized track and rest frequency that produce the maximum integrated spectral value are taken as the estimated parameters for the target at the end of the search.

The above-described method avoids many of the difficulties which occur in the implementation of TMA algorithms. There is no need to extract discrete estimates of the target bearing and frequency at the sonar output since raw spectral data is used as the inputs. Furthermore, the algorithm always integrates along a fixed coordinate trajectory corresponding to a hypothesized target track so that a low SNR or fading target is correctly integrated over the total observation time. The algorithm does not "lock on" to a strong noise peak or "lose lock" during a signal fade whereas a recursive signal follower might "lock on" or "lose lock" under those conditions. The method not only provides an estimate of the target range and course but also, as a consequence of its long-term integration of raw spectral estimates, provides an increased detection capability as well. It should be noted that the total observation time may be on the order of hours whereas the integration time of a typical sonar processor is in the range of 5-80 seconds for each spectral output of the sonar processor, i.e. for each line on a spectrogram display. The overall non-coherent integration time possible in a conventional sonar processor is set by the size of the display surface that the sonar operators may view and the time that the target tonal remains in a single beam and frequency bin. The latter constraint on integration time is the determining factor for the narrow beams and frequency bins produced by a modern towed-array signal processor. This constraint is removed by the TMA method according to the present invention since the integration varies in both the bearing and frequency coordinates.

Target motion analysis (TMA) can be performed directly from the beam spectra produced by a towed line array sonar processor using an algorithm developed at the Defence Research Establishment Pacific. The data available to the algorithm is taken from the output of the front-end sonar processor, consisting of a beamformer followed by a spectrum analyzer. In the algorithm, $B_k(f,\cos\beta)$ denotes the power spectrum at a frequency f and beam angle $\beta$ at time index k, where $1 \leq k \leq K$. The dependence of $B_k$ on the steering angle $\beta$ is expressed through $\cos\beta$ and initially f and $\cos\beta$ can be allowed to assume arbitrary (not necessarily discrete) values for convenience. $B_k$ can be thought of as a two-dimensional frequency-azimuth (FRAZ) spectrum, the spectrum $B_k$ being referred to simply as a FRAZ. The integration time used in producing each FRAZ at a particular time k is short, i.e. typically 15–120 seconds which is the "update time" of the front-end processor. The idea of this TMA method is to form long-term integrated spectral values from the short-term values according to the equation $$\sum_{k=1}^{K} B_k(f_k,\cos\beta_k) \quad (1)$$

where $f_k$ and $B_k$ are the frequency and angle coordinates that would theoretically be observed by the sonar at time k from an assumed target. The long-term integrated power in Equation (1) should attain a maximum when the coordinate trajectory $(f_k,\cos\beta_k)$ of an assumed target aligns with the coordinate trajectory of an actual target. It then becomes apparent that TMA based on an exhaustive search is feasible by searching over a large number of hypothesized coordinate sequences $(f_k,\cos\beta_k)$ and looking for peaks in the long-term integrated power.

The search over a large number of hypothesized coordinate sequences presents a computational problem in calculating the coordinate trajectories $(f_k,\cos\beta_k)$ and performing the addition in Equation (1) along the trajectories. This computational burden is sufficiently great that specialized hardware becomes a necessity when the number of trajectories is large. This also requires that a systematic method of generating the hypothesized coordinate trajectories be chosen so as to represent the majority of potential targets without undue computational complexity.

In order to minimize the computations needed to generate a target's coordinate trajectory only constant velocity tracks are searched since this will lessen the number of parameters required to describe a target. The coordinate vector of a target relative to the origin of a coordinate system at integration time k is denoted by $r_k=(X_k,Y_k)$ so that $r_1$ is the target's initial position and $r_K$ its final position. A Doppler/bearing TMA is possible if the target is emitting a narrowband tonal, in which case $f_o$ would denote the rest frequency of the tonal. The vector of parameters used to specify a target is denoted by p so that the parameter vector p for bearings-only TMA will be $p=(r_1,r_K)$ whereas for Doppler/bearing TMA, it will be $p=(r_1,r_K,f_o)$. Since the bearings-only case is computationally simpler than the Doppler/bearing case, the latter will be considered in the following description with comments being inserted where needed to illustrate the differences. Assuming constant velocity tracks, the coordinate trajectory $(f_k,\cos\beta_k)$ is determined completely from the vector p. The long-term integrated spectral power is denoted by $<B(p)>$ so that Equation (1) can be written as:

$$<B(p)> = \sum_{k=1}^{K} B_k(f_k,\cos\beta_k) \quad (2)$$

where $f_k=f_k(p)$ and $\beta_k=\beta_k(p)$. A search can then be conducted over values of p within a pre-defined volume and the value $\hat{p}=\text{argmax} <B(p)>$ that maximizes $<B(p)>$ is taken to be an estimate of the target parameters. The maximizing value $\hat{p}$ is that value for which $(f_k,\cos\beta_k)$ is aligned with a spectral peak most consistently during the long-term integration. It should be noted that strong peaks are automatically weighted more heavily than weaker peaks. If the search volume contains multiple targets, then local maxima as well as a global maximum must be found.

The coordinate trajectory $(f_k,\cos\beta_k)$ can now be computed given the parameter vector p. First of all, it is necessary to distinguish between the beam angle $\beta$ and the true target bearing $\theta$ measured with respect to the array heading when the dominant arrival path is a bottom-bounce path. These two angles are connected by the equation $\cos\beta=\cos\theta\cos\psi$ for a towed line array, $\psi$ being the vertical arrival angle at the array. The depths of the sonar array and target are usually small compared to the water depth H. Therefore, to a good approximation, $\cos\psi$ is given by $$\cos\psi = \frac{R}{\sqrt{R^2 + (2lH)^2}} \quad (3)$$

where R is in the range to the target and $l=0, 1, 2...$ is the arrival order ($l=0$ for the direct path $l=1$ for the first bottom-bounce arrival, etc.). The beam angle is equal to the true target bearing for a direct-path arrival when this approximation is used.

Information is also required concerning the track of the towed array in addition to the vector p of target parameters. A two-dimensional vector giving the x,y coordinates of the towed array with respect to the origin at time k is denoted by $a_k$. Generally, the origin of the coordinate system will be near the array track such as at $a_1$, the initial array position. The velocity vector of the array at time k is denoted by $\dot{a}_k$. Both $a_k$ and $\dot{a}_k$ are measured quantities which are known before the search begins. An array heading vector of unit magnitude is defined, for convenience, by $h_k=\dot{a}_k/\|\dot{a}_k\|$. The velocity v of the hypothesized target will then be $v=(r_K-r_1)/T$ where T denotes the total observation time. Therefore, the position of the target relative to the array at time k is $$R_k=r_1+t_kv-a_k \quad (4)$$

where $t_k$ is the time of the $k^{th}$ update. Letting $R_k=\|R_k\|$ and defining a unit vector $u_k=R_k/R_k$ that points from the array to the target results in having $$\cos\theta_k=u_k \cdot h_k \quad (5)$$

and $$\cos\psi_k = \frac{R_k}{\sqrt{R_k^2 + (2lH)^2}}. \quad (6)$$

The angle coordinate $\cos\beta_k$ observed at the time k can be computed from Equations (5) and (6) since $\cos\beta_k$ $=\cos\theta_k \cos\psi_k$. The relative velocity between the target and the array is denoted by $v_k \equiv v - \dot{a}_k$ and the frequency coordinate at time k is then given by $$f_k = f_o\left(1 - \frac{u_k \cdot v_k}{c} \cos\psi_k\right) \quad (7)$$

where C represents the speed of sound in water and is assumed to be constant.

The above-described algorithm requires a search over a volume and the integration specified in Equation (2) must be carried out along the coordinate trajectory $(f_k, \cos\beta_k)$ specified by the above equations for each value of p within the volume. It is desirable to frame the algorithm in such a way that it uses only the data stored in the database of a typical sonar processor, i.e. the two-dimensional spectra $B(f, \cos\beta)$ given on a discrete frequency-azimuth grid. Assuming that the sonar processor produces P frequency bins and Q beams with the frequency spacing being constant, as from an FFT, then the P frequencies are given by the equation $$f^{(p)} = f_s + p\Delta f, \quad 0 \leq p \leq P-1 \quad (8)$$

where $f_s$ is the start frequency and $\Delta f$ is the spacing between frequency bins. Furthermore, assuming that the Q beams are spaced equally in $\cos\beta$, then $$\cos\beta^{(q)} = \cos\beta_s + q\Delta(\cos\beta), \quad 0 \leq q \leq Q-1 \quad (9)$$

where $\cos\beta_S$ is the cosine of the start angle and $\Delta(\cos\beta)$ is the beam spacing. Then given a coordinate trajectory $(f_k, \cos\beta_k)$, a sequence of corresponding integer frequency and angle coordinates $(p_k, q_k)$ can be computed such that the differences $$|f^{(p_k)} - f_k| \text{ and } |\cos\beta^{(q_k)} - \cos\beta_k| \quad (10)$$

are minimized, and $B(f_k, \cos\beta_k)$ is approximated by $B(f^{(p_k)}, \cos\beta^{(q_k)})$. In other words, $B(f_k, \cos\beta_k)$ is approximated by its value at the closest bin in the pre-computed two-dimensional FRAZ spectrum. This assumes that the FRAZ spectra are computed on a grid that is sufficiently dense that only a small error is incurred by this approximation. A more general approach would use interpolation of several bins from the FRAZ spectrum to get a refined estimate of the spectrum level at the coordinate value $(f_k, \cos\beta_k)$. For notational convenience, a matrix $\tilde{B}(p,q)$ is defined by $$\tilde{B}(p,q) = B(f^{(p)}, \cos\beta^{(q)}), \begin{cases} 0 \leq p \leq P-1 \\ 0 \leq q \leq Q-1 \end{cases} \quad (11)$$

The long-term integrated sum in Equation (2) is then approximated by $$<B(p)> \cong \sum_{k=1}^{K} \tilde{B}_k(p_k, q_k). \quad (12)$$

SUMMARY OF THE INVENTION

A method of target motion analysis according to the present invention can deal with many of the previously mentioned difficulties associated with known signal processing in which the time integration is always for the same frequency bin and the same beam or azimuth. The method according to the present invention provides enhanced detection capabilities which can be used for bearing-only and Doppler/bearing TMA.

A system for target detection and localization by target motion analysis (TMA) using data from a passive sonar array, according to the present invention, is one which determines when the coordinate trajectory of a hypothesized target aligns with the coordinate trajectory of an actual target and operates by forming long-term integrated spectral values from short-term spectral values according to frequency and angle coordinates which cover a search grid within a predefined volume; the system including a hypothesized track generator whose output is applied to a first chain of latches connected in series with each latch being associated with separate stages, each stage containing a computational element (CE) provided with non-acoustic data from a tow-ship's navigation system and the array's environmental instrumentation and a local random-access memory (RAM) provided with data from the array's sonar processor, each CE being connected to an associated RAM with an output from each latch in the first chain being connected to an input of its associated CE, wherein the track generator can generate hypothesized target tracks for a search grid in the form of vectors which are clocked downward in the first chain of latches with each computational element CE computing frequency and angle addresses $(p_k, q_k)$ for a track vector, which is obtained from its associated latch, those addresses being applied to a computational element's associated local RAM that holds data for a single two-dimensional FRAZ spectrum ($B_k$), a first local RAM in a first stage having an output connected to a first latch whose output is connected to an input of a first adder whose other input is connected to an output of a second local RAM in a second stage, the first adder's output being connected to an input of a further latch whose output is connected to a further adder whose other input is connected to an output of a third local RAM in a third stage with the output of the further adder being connected to an input of a still further latch, an output of each of the other local RAM for each stage being connected to an input of another adder whose other input is connected to an output of a preceding stage's still further latch, that further latch having an input connected to an adder associated with a previous stage forming a summation pipeline, the output of the adder associated with the last stage supplying a completed sum of short-term spectra to an output stage display device.

A system for target detection and localization by target motion analysis (TMA) using data from a passive sonar array according to a further embodiment of the invention is one in which each computational element (CE) includes a numeric processor to which target track data from a latch in said chain is supplied along with said predetermined non-acoustic data which is independent of the hypothesized target track geometry, the numeric processor determining the angle address $q_k$ which is directed to a latch whose output $q_k$ is applied to an associated RAM for a specified number of clock cycles, the numeric processor also determining a quantity to compute frequency addresses $p_k$, that quantity being directed to another latch whose output is applied for the specified number of clock cycles to an adder in the computational element, an output of that adder being applied to a latch whose output is applied back to a second input of the computational element's adder to perform a recursion wherein an output from the last-mentioned latch provides a frequency address $p_k$ which is applied on each clock cycle to the RAM associated with that CE.

BRIEF DESCRIPTION OF THE DRAWINGS

The invention will now be described in more detail with reference to the accompanying drawings, in which.

for a large number of hypothesized target tracks; and

Figure 3:
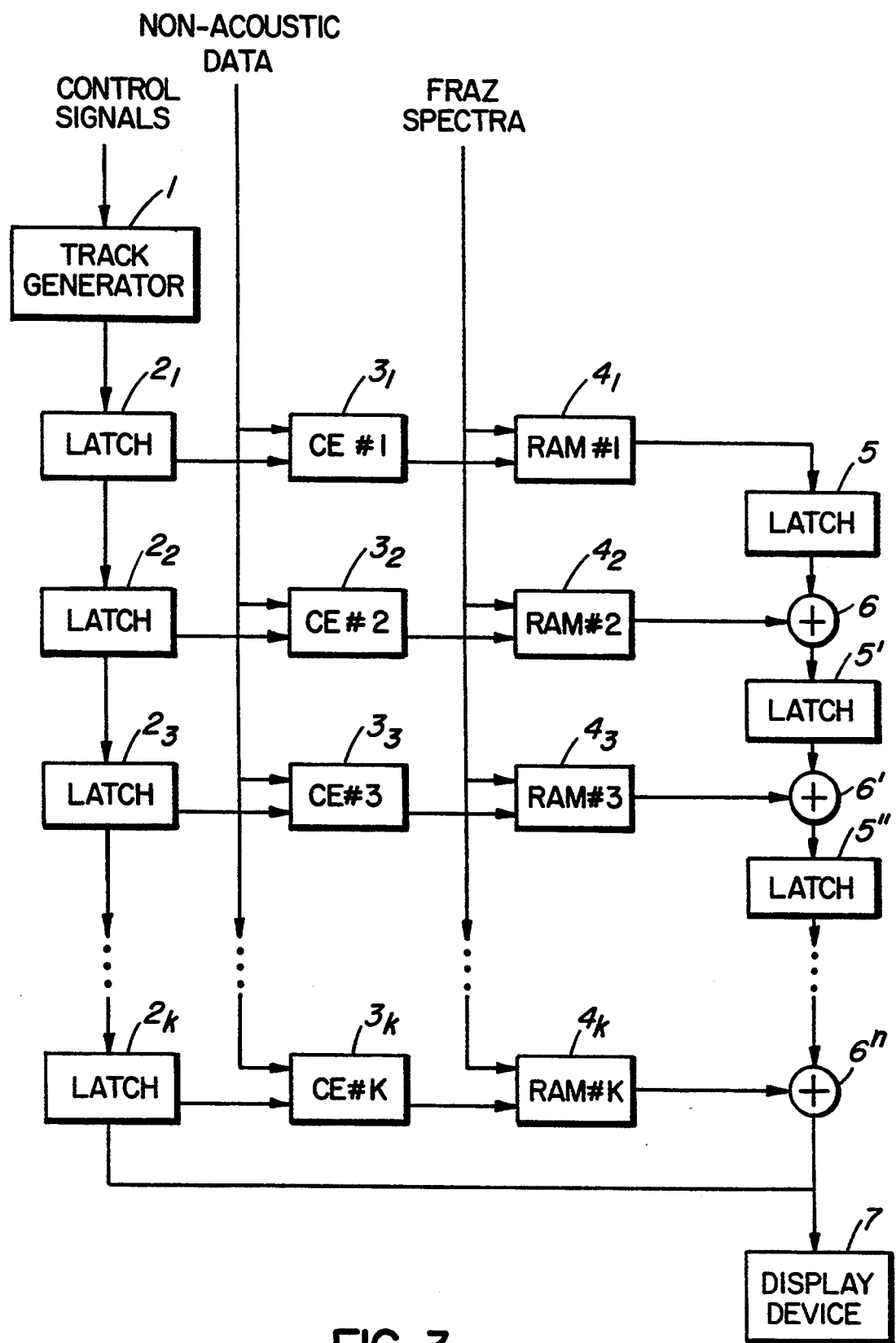
FIG. 3 is a block diagram of a system according to the present invention which can rapidly evaluate $$<B(p)> \simeq \sum_{k=1}^{K} \widetilde{B}_k(p_k, q_k)$$
Figure 4:
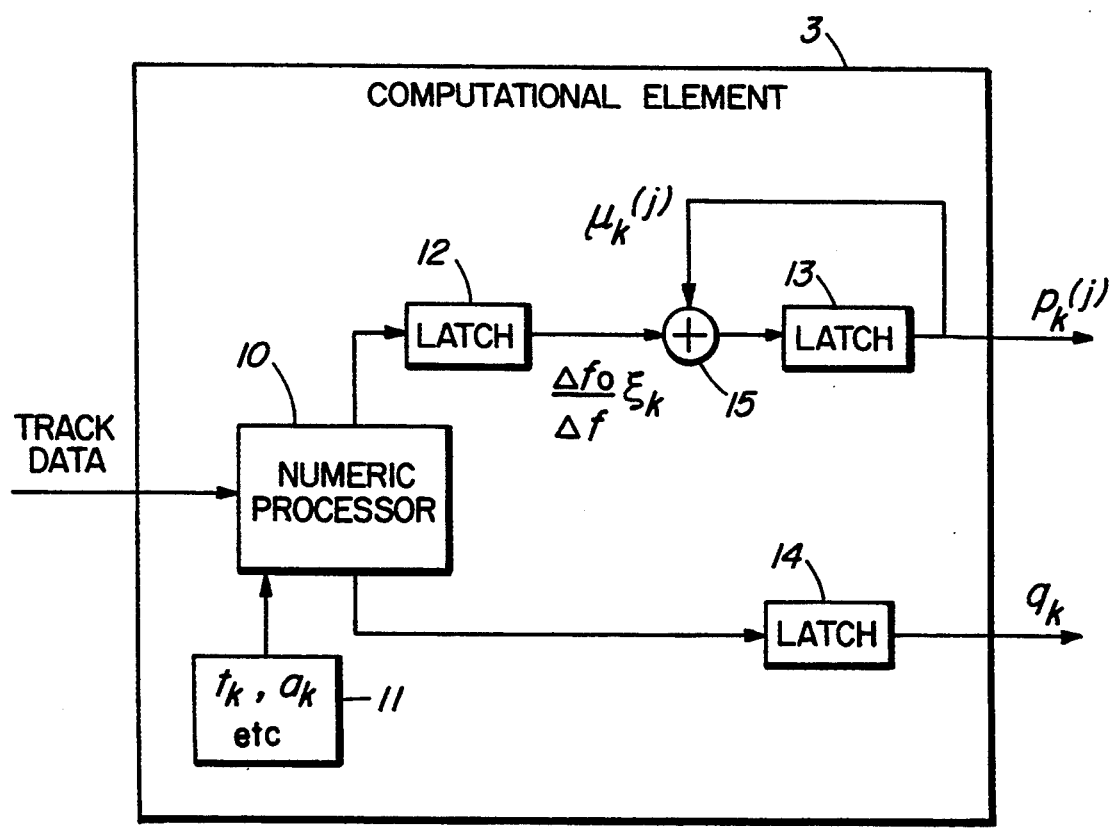

FIG. 4 is a block diagram of one of the computational elements shown in FIG. 3.

DESCRIPTION OF THE PREFERRED EMBODIMENT

Figure 1:
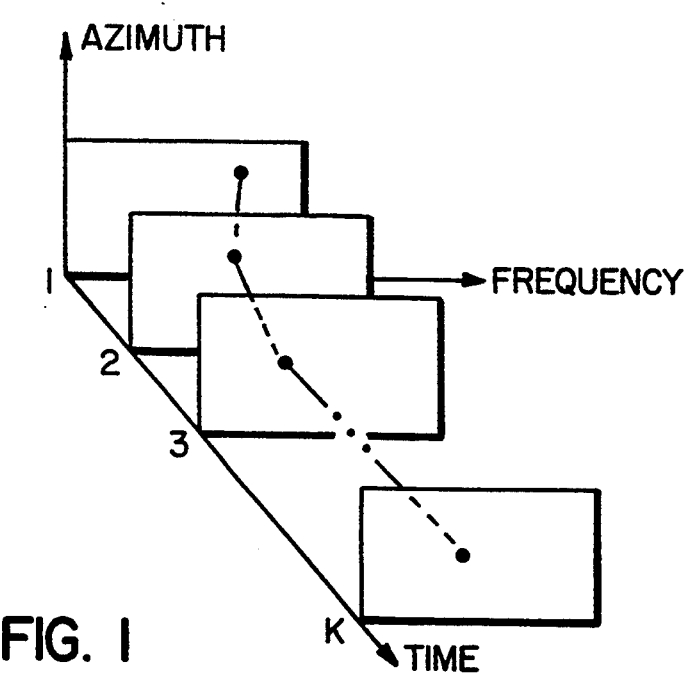
FIG. 1 illustrates a single track summation in which the boxes represent the time sequence of the two-dimensional FRAZ spectra with the coordinate trajectory being illustrated by a line.

A single track summation is illustrated in FIG. 1 in which the boxes represent the time-sequence of the two-dimensional FRAZ spectra and the coordinate trajectory is illustrated by a line. Although the hypothesized target track is assumed to be linear, the summation path through FRAZ space will in general be curved.

Figure 2:
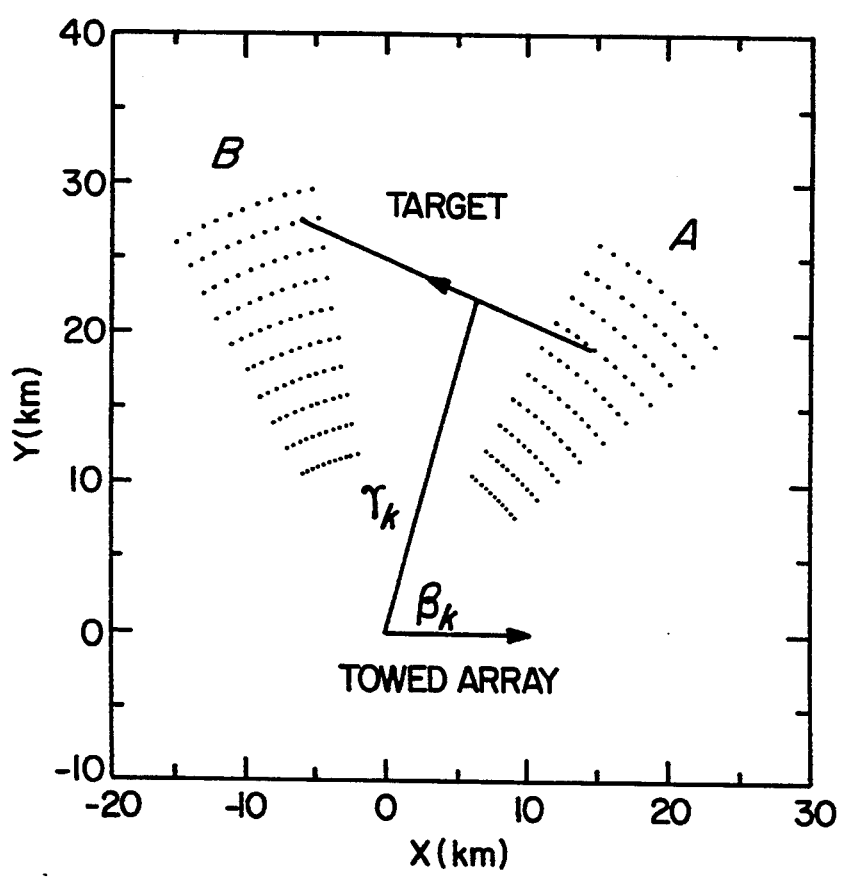
FIG. 2 illustrates an example of a search grid and a single hypothesized track.

FIG. 2 illustrates an example of a search grid which can be used showing a single hypothesized track. A search can be organized by specifying a set A of initial track points, a set B of final track points and a set F of rest frequencies. Then $<B(p)>$ is evaluated for all $p \in A \times B \times F$ to find the maximizing value $\hat{p}$. The set A is an angular sector in the plane, delineated by two bounding angles and by minimum and maximum ranges. This sector will be discretized in both angle and range creating a grid of size $N_a \cdot N_r$ where $N_a$ and $N_r$ are the number of discrete angles and ranges, respectively. The set B is similarly defined over a second angular sector forming a search grid as shown in FIG. 2. In general the sets A and B could overlap and might even be the same for a wide-area search. The grid size $N_a \cdot N_r$ for B will usually, although not necessarily, be the same as for A. Furthermore, the set F contains $N_f$ equi-spaced frequencies. Therefore, the number of points within a search volume $A \times B \times F$ in which the grid sizes of A and B are the same would be $(N_a \cdot N_r)^2 N_f$.

FIG. 3 is a block diagram of a hardware system to implement the algorithm and which can evaluate $<B(p)>$ in Equation (12) rapidly for a large number of hypothesized target tracks given K pre-computed FRAZ spectra. The basic system comprises a control device (not shown) providing control signals to a track generator 1 which feeds into K identical stages that are sequenced so as to function as a summation pipeline. The system can be easily modularized since all of the stages are identical. The FRAZ spectra required by the algorithm are supplied by the front-end sonar processor, consisting of a beam former followed by a spectrum analyzer. Non-acoustic data is also available to the algorithm such as that supplied from the tow-ship's navigation system and from the towed array's environmental instrumentation, i.e. heading sensors, etc.

The track generator 1 generates the hypothesized target tracks over which the search proceeds. The track generator could put out vectors of the form $(r_1, v)$ for example, where $r_1$ is the initial position of the target and v is its velocity. These track vectors will then be clocked downward in the leftmost chain of latches $2_1$, $2_2 \ldots 2_K$. The latches 2 are temporary holding devices which output what is in them on the next clock cycle. Each stage has a computational element (CE) ($3_1, 3_2 \ldots 3_K$) connected to a corresponding latch 2, the purpose of the CE being to compute from the input track vector, an address $(p_k, q_k)$ into the local random-access memories (RAM) $4_1, 4_2 \ldots 4_K$. Each CE must also have access to some data which is independent of the assumed track geometry, such as the assumed rest frequency $f_o$, the time $t_k$ and the array track data $a_k, \dot{a}_k$. This data can be downloaded into the local program stores (11 as illustrated in FIG. 4) of the computational element (CE) before the search is commenced. The RAM 4 at each stage holds the data for a single two-dimensional FRAZ spectrum $\widetilde{B}_k$.

The first RAM $4_1$ is connected to a latch 5 which is connected to a summer 6, the second RAM $4_2$ being also connected to summer 6 whose output is connected to latch 5'. The output of latch 5' is connected to a second summer 6' whose output is connected to a further latch 5'' with the output of the third RAM $4_3$ being connected to the second input of summer 6'. The latches 5', 5''... etc. and summers 6, 6'... $6^n$ are connected in this manner for each stage k forming a right-hand summer chain. The output of the last summer $6^n$ provides a completed sum output to a display 7. On each clock cycle, the RAM output at stage k and the latched result obtained from stage k-1 on the previous clock cycle are summed in a summer 6 whose output is latched in the next latch 5 for use by the next stage on the subsequent clock cycle. The partial sums of Equation (12) are propagated in this manner down the right-hand summer chain of FIG. 1 until the completed sum $$\sum_{k=1}^{K} \widetilde{B}_k(p_k, q_k)$$

emerges at the bottom from the last summer $6^n$. Therefore, when K = 100 short-term spectra are used in the summation, it will require 100 cycles for a summation to be completed. However, assuming that the computation is fully pipelined so that partial sums for different tracks reside at all stages of the right-hand summer chain and propagate simultaneously from one stage to the next on a single clock cycle, then a complete sum will be produced at output $6^n$ on every clock cycle once the pipeline is full.

An advantage of the above-described architecture is its efficient use of RAMs. The system according to the present invention is organized so that each CE 3 needs to access only a single FRAZ which is held in its local RAM 4. In this manner, all K RAMs can be accessed on each clock cycle with no contention.

Another advantage of a system according to the present invention and illustrated in FIG. 3 is that the spectrum $\widetilde{B}_k$ from the $k^{th}$ update of the sonar processor need not reside in RAM $4_k$. The FRAZ spectra may be stored in any order in the pipeline. This property makes it easy to update a set of FRAZ spectra since the local RAM stores of the different stages may be treated as forming a circular buffer. It is also possible that it may be desirable to perform the summation in Equation (12) using fewer FRAZs than there are stages in the hardware pipeline. This could be handled by a slight modification to FIG. 3 in which the output from each adder is also attached through a tri-state buffer to a common output bus so that the output at the desired stage can be put onto the common bus or, alternatively, by filling unwanted RAM memories with zeros.

The number of points with a search volume $A \times B \times F$ would be $(N_a \cdot N_r)^2 N_f$ as was previously described and illustrated in FIG. 2. The track generator generates the hypothesized target track over which the search proceeds and this is done sufficiently fast to keep the summation hardware working full out. Only one track generator is needed for the entire system. Target tracks that are not feasible for a real target can be eliminated from the search grid by the track generator in order to reduce the search volume and ensure that the track generator will meet the speed requirements while remaining only a small fraction of the total cost of the system.

The heart of each stage in the pipeline is the computational element (CE) 3 which computes an address into its local RAM store or, equivalently, computes the matrix indices ($p_k, q_k$) in Equation (12). This computation is the most complex and time consuming part of the algorithm. In order for the system to put out a completed summation every clock cycle, a new address must be computed every clock cycle into each RAM 4. The expressions that must be evaluated are quite complex requiring at least one square root to evaluate $R_k = \| R_k \|$ and several divisions. If a bottom-bounce model is used, an additional square root computation is necessary. However, in the case of Doppler/bearing TMA, the computations may be decomposed into a two-stage pipeline wherein the first stage handles the more difficult geometric computations and the second stage handles the relatively simple frequency computations. The number of clock cycles available for the first stage is considerably increased by noting that the track geometry remains fixed during the search over frequency.

This will now be explained in more detail by starting with the definitions of indices $p_k$ and $q_k$ given in Equation (10) with $p_k$ being a frequency index and $q_k$ being an angle index. First assume that P and Q in Equations (8) and (9) are powers of 2 so that the RAM address may be formed by simply concatenating the binary representations of $p_k$ and $q_k$. Therefore, if 512 frequency bins and 256 beams are allowed, $p_k$ may be viewed as the upper 9 address bits and $q_k$ as the lower 8 address bits. The differences in Equation (10) can be minimized by working backward from equations (8) and (9). Letting square brackets [.] denote the nearest-integer function and $\lfloor . \rfloor$ the truncation function, then $$p_k = \left[ \frac{f_k - f_s}{\Delta f} \right] = \left\lfloor \frac{f_k - f_s}{\Delta f} + 0.5 \right\rfloor \quad (13)$$

and $$q_k = \left[ \frac{\cos\beta_k - \cos\beta_s}{\Delta(\cos\beta)} \right] = \left\lfloor \frac{\cos\beta_k - \cos\beta_s}{\Delta(\cos\beta)} + 0.5 \right\rfloor. \quad (14)$$

Note that the Doppler expression $$f_k = f_o \left( 1 - \frac{U_k \cdot V_k}{C} \cos\psi_k \right),$$

in Equation (7) used to compute $f_k$ in Equation (13) is linear in the rest frequency $f_o$ and that $U_k \cdot V_k$ and $\cos\psi_k$ depend only on track geometry. This observation allows recursive generation of consecutive frequency indices. It will be necessary, in general, to search over a large number of rest frequencies (e.g. $N_f = 50-100$ with the jth frequency being denoted by $f_o^{(j)}$). Assuming that the $N_f$ search frequencies are equi-spaced and starting at a frequency $f_o^{(o)}$ with an increment $\Delta f_o$, then the jth search frequency will be given by $f_o^{(j)} = f_o^{(o)} + j\Delta f_o$. The Doppler-shifted frequency at time k corresponding to the jth rest frequency is obtained by substituting $f_o^{(j)}$ into Equation (7), giving:

$$f_k^{(j)} = f_o^{(j)} \left( 1 - \frac{U_k \cdot V_k}{C} \cos\psi_k \right) = f_o^{(j)} \xi_k, \quad (15)$$

where $\xi_k$ is used to denote the expression in parentheses. A recursion is now defined as follows:

$$\mu_k^{(o)} = \frac{f_k^{(o)} - f_s}{\Delta f} + 0.5 \quad (16)$$

$$\mu_k^{(j)} = \mu_k^{(j-1)} + \frac{\Delta f_o}{\Delta f} \xi_k, \quad (17)$$

where it is assumed the $\mu^{(j)}{}_k$ is computed using fixed-point arithmetic. From equation (13) and (15), it is seen that the frequency index at time k for the jth search frequency is given by $p^{(j)}{}_k = \lfloor \mu^{(j)}{}_k \rfloor$. This can be obtained merely by tapping off the integer part of the fixed-point computation. The term $(\Delta f_o / \Delta f)\xi_k$ in Equation (17) can be pre-computed before the recursion begins so that the recursion proceeds by performing a single accumulation. Since $\Delta f_o / \Delta f$ remains the same for all target tracks (unlike $\xi_k$), it can also be pre-computed by a host computer before the search begins. Typically, $\Delta f_o / \Delta f$ will be chosen to be near unity and $\xi_k \cong 1$ for feasible target tracks. Therefore, $(\Delta f_o / \Delta f)\xi_k \cong 1$ as well.

One embodiment of a computational element 3 is illustrated in the block diagram shown in FIG. 4. Element 11, a local program store, provides the numeric processor 10 with data that is independent of the assumed target track geometry, such as the assumed rest frequency $f_o$, the time $t_k$, the coordinates of the towed array $a_k$ and velocity vector of the array $\dot{a}_k$. This non-acoustic data, as illustrated in FIG. 3, is downloaded into the local store 11 of each CE before the search begins. During the search, track data to the numeric processor 10 is supplied from its associated latch 2. The numeric processor 10 computes those quantities that depend on the track geometry ($\xi_k$ and $q_k$) using the track data and the data in local store 11. The adder 15 performs a recursion to provide an output $p^{(j)}{}_k$. The recursion is performed by applying a term $$\frac{\Delta f_o}{\Delta f} \xi_k$$

from processor 10 to a latch 12 whose output is applied to one input of adder 15 whose output is applied to latch 13. The output of latch 13 ($\mu^{(j)}_k$) is then applied to adder 15's other input. The recursion is a trivial computation and can easily be performed every clock cycle.

The beam coordinate $q_k$ from the numeric processor 10 is applied through a latch 14 to the output of computational element 3 while the frequency coordinate $p_k^{(j)}$ is obtained from the output of latch 13.

The geometric information provided by the numeric processor 10 remains fixed during the recursion resulting in the processor 10 having at least $N_f$ clock cycles to produce its next output. The summation pipeline can run at full speed as long as $N_f > N_g$ where $N_g$ denotes the number of cycles required by the numeric processor 10 to compute the geometric quantities and $N_f$ is the number of equi-spaced frequencies in the grid. The computation of the geometric quantities can then take up to 50, or even 100, cycles while still allowing the summation pipeline to operate at full speed. The computational element 3 would, however, become a computational bottleneck in the case of bearings only TMA for which $N_f = 1$ and the summation pipeline would run at a reduced rate. However, for bearing-only TMA the frequency address $p_k$ can be fixed during the entire search so that only the beam address $q_k$ would be required to vary in accordance with the assumed target track.

A TMA algorithm based on direct integration of short-term beam spectra has been described along with a suitable hardware architecture to implement that algorithm. The hardware shown in FIG. 3 is based on pipelining the integration with each stage of the pipeline being dedicated to a single FRAZ spectrum. The system may be easily extended to long integration times since all the hardware modules for the stages are identical. Even extensive searches can be performed in real time by this hardware since, assuming a clock rate of 10 MHz, the system would require only 100 ns for each point in the search volume.

Various modifications may be made to the preferred embodiments without departing from the spirit and scope of the invention as defined in the appended claims.

The embodiments of the invention in which an exclusive property or privilege is claimed are defined as follows:

1. A system for target detection and localization by target motion analysis (TMA) using data from a passive sonar array which system determines when the coordinate trajectory of a hypothesized target aligns with the coordinate trajectory of an actual target and which operates by forming long-term integrated spectral values from short-term spectral values according to frequency and angle coordinates which cover a search grid within a predefined volume; the system including a hypothesized track generator whose output is applied to a first chain of latches connected in series with each latch being associated with separate stages, each stage containing a computational element (CE) provided with non-acoustic data from a tow-ship's navigation system and an array's environmental instrumentation and a local random-access memory (RAM) provided with data from the array's sonar processor, each CE being connected to an associated RAM with an output from each latch in the first chain being connected to an input of its associated CE, wherein the track generator can generate hypothesized target tracks for a search grid in the form of vectors which are clocked downward in the first chain of latches with each computational element CE computing frequency and angle addresses ($p_k, q_k$) for a track vector, which is obtained from its associated latch, those addresses being applied to a computational element's associated RAM that holds data for a single two-dimensional FRAZ spectrum ($B_k$), a first local RAM in a first stage having an output connected to a first latch whose output is connected to an input of a first adder whose other input is connected to an output of a second local RAM in a second stage, the first adder's output being connected to an input of a further latch whose output is connected to a further adder whose other input is connected to an output of a third local RAM in a third stage with the output of the further adder being connected to an input of a still further latch, an output of each of the other local RAM for each stage being connected to an input of another adder whose other input is connected to an output of a preceding stage's still further latch, that further latch having an input connected to an adder associated with a previous stage forming a summation pipeline, the output of the adder associated with the last stage supplying a completed sum of short-term spectra to an output stage display device.

2. A system as defined in claim 1, wherein each computational element (CE) includes a numeric processor to which target track data from a latch in said chain is supplied along with said non-acoustic data which is independent of the hypothesized target track geometry, the numeric processor determining the angle address $q_k$ which is directed to a latch whose output $q_k$ is applied to an associated RAM for a specified number of clock cycles, the numeric processor also determining a quantity to compute frequency addresses $p_k$, that quantity being directed to another latch whose output is applied for the specified number of clock cycles to an adder in the computational element, an output of that adder being applied to a latch whose output is applied back to a second input of the computational element's adder to perform a recursion wherein an output from the last-mentioned latch provides a frequency address $p_k$ which is applied on each clock cycle to the RAM associated with that CE.

3. A system as defined in claim 2, wherein each computational element includes a local program store in which said non-acoustic data is stored.

4. A system as defined in claim 3, wherein said data from the array's sonar processor is taken from an output of a front-end sonar processor consisting of a beam former followed by a spectrum analyzer which data is applied to the random access memories.

5. A system as defined in claim 4, wherein said sonar array is a towed line array.

6. A system as defined in claim 2, wherein said data from the array's sonar processor is taken from an output of a front-end sonar processor consisting of a beam former followed by a spectrum analyzer which data is applied to the random access memories.

7. A system as defined in claim 6, wherein said sonar array is a towed line array.

8. A system as defined in claim 3, wherein said sonar array is a towed line array.

9. A system as defined in claim 1, wherein said sonar array is a towed line array.

10. A system as defined in claim 9, wherein each computational element (CE) includes a numeric processor to which target track data from a latch in said chain is supplied along with said non-acoustic data which is independent of the hypothesized target track geometry, the numeric processor determining the angle address $q_k$ which is directed to a latch whose output $q_k$ is applied to an associated RAM for a specified number of clock cycles, the numeric processor also determining a quantity to compute frequency addresses $p_k$, that quantity being directed to another latch whose output is applied for the specified number of clock cycles to an adder in the computational element, an output of that adder being applied to a latch whose output is applied back to a second input of the computational element's adder to perform a recursion wherein an output from the last-mentioned latch provides a frequency address $p_k$ which is applied on each clock cycle to the RAM associated with that CE.

* * * * *